Oct. 10, 1933.  G. KLARENAAR ET AL  1,929,640
ELECTROMAGNETIC DEVICE FOR OSCILLATING
THE HEADLIGHTS OF MOTOR VEHICLES
Filed Dec. 21, 1932
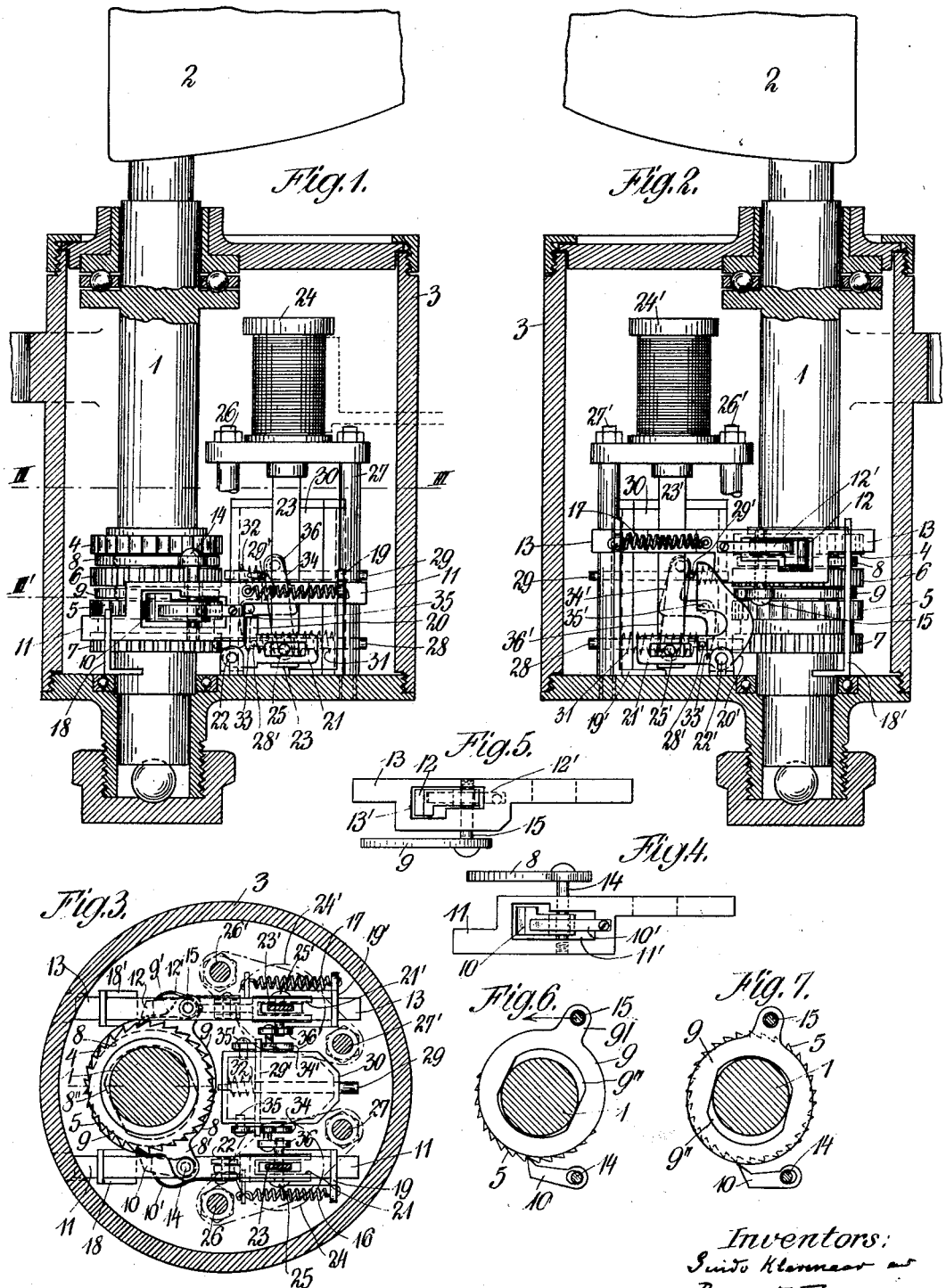
Inventors:
Guido Klarenaar
Bernhard Franz
by
Attorney.

Patented Oct. 10, 1933

1,929,640

UNITED STATES PATENT OFFICE 1,929,640

ELECTROMAGNETIC DEVICE FOR OSCILLATING THE HEADLIGHTS OF MOTOR VEHICLES

Guido Klarenaar, Dusseldorf-Neuss, and Bernhard Franz, Dusseldorf-Oberkassel, Germany Application December 21, 1932, Serial No. 648,210, and in Germany December 23, 1931

4 Claims. (Cl. 240—61.9)

This invention relates to an electromagnetic device for oscillating the headlights of motor vehicles. This oscillation of the headlights has for its object to deflect the light beams of the headlights of vehicles approaching one another so that the drivers are not mutually dazzled. Both headlights can be oscillated in both directions either separately or jointly. The amplitude of oscillation of both headlights is preferably about 12° to the right relative to the longitudinal axis of the vehicle. The right headlight will thus illuminate chiefly the right side of the road whereas the left headlight will illuminate the surface of the road in front of the vehicle. The oscillation of each headlight is effected according to the invention by rotating in stages a shaft on which the headlight is mounted. The shaft is rotated by means of a slide which is actuated by an electromagnet through the intermediary of a press button and acts on a ratchet wheel on the headlight shaft by means of a pawl. By means of a second press button and a suitable change over switch a second electromagnet can be excited which likewise shifts one tooth at a time a slide with pawl on a ratchet wheel on the shaft of the headlight, but in the opposite direction of rotation of the headlight shaft so that this latter can be adjusted in the opposite direction of rotation. The arrangement is constructed so that each slide on being actuated disengages the pawl of the other slide by means of an ejector. The adjustments of the shaft are locked tooth by tooth by means of a locking device which is disengaged by each slide on being operated and returns into its locking position after the operation of the slide. The switching device enables by engaging the same electromagnet fifteen times the headlight shaft to be rotated fifteen times through an angle of 12° that is by 180° so that the headlight projects its rays towards the rear and can be used for illuminating in the case of repairs.

An embodiment of the invention is illustrated by way of example in the accompanying drawing in which:

Fig. 1 shows the device in elevation seen from the left side with the casing cut open.

Fig. 2 is a similar view from the right side.

Fig. 3 is a horizontal cross section on line III—III and partly on line III'—III of Fig. 1.

Fig. 4 is an elevation of the left side seen from the left side.

Fig. 5 is a similar view of the right side.

Figs. 6 and 7 show one of the two pawl disengaging elements in two positions.

A shaft 1 carrying a headlight 2 is journalled on ball bearings in a casing 3. Two ratchet wheels 4 and 5 and two spur wheels 6 and 7 are keyed on the shaft and two discs 8 and 9 loosely mounted thereon. The teeth of the ratchet wheel 4 are in the opposite direction to those of the ratchet wheel 5, as shown in Fig. 5. A pawl 10 of a slide 11 on the left side of the shaft engages the ratchet wheel 5 where as a pawl 12 of a slide 13 engages the ratchet wheel 4 on the right side of the shaft. The pawls 10 and 12 are mounted in recesses 11' and 13' of their respective slides and oscillatable on bolts 14 and 15 respectively, being pressed against their ratchet wheels 5 and 4 by springs 10' and 12' respectively. The bolts 14 and 15 are rigidly screwed into their coordinate slides 11 and 13 respectively. The loose disc 8 is hingedly connected to the pawl bolt 14 of the slide 11 by means of a lug 8' and the loose disc 9 is similarly connected to the pawl bolt 15 of the slide 13 by means of a lug 9'. The pawl 10 of the slide 11 is widened and extends over the edge of the loose disc 9 connected to the slide 13 and the pawl 12 of the slide 13 has also a widened portion extending over the edge of the loose disc 8 connected to the slide 11. Consequently, when the slide 11 is shifted and the shaft 1 rotated the distance of one tooth by means of the pawl 10 and the ratchet wheel 5, the loose disc against which the pawl 12 of the slide 13 bears will be rotated a corresponding distance on the pawl bolt 14. If the slide 13 is shifted and the shaft 1 rotated the distance of one tooth by means of the pawl 12 and the ratchet wheel 4, the loose disc 9 on which the pawl 10 of the other slide 11 bears will be rotated a corresponding distance on the pawl bolt 15. As the slide 11 rotates the shaft 1 in one direction and the slide 13 in the other direction and as the pawl of the non-actuated slide always prevents the rotation of the shaft by the pawl of the actuated slide, the discs 8 and 9 are constructed so that the disc 8 or 9 shifted or rotated with its coordinate slide each time disengages the pawl of the other non-actuated slide. For this purpose the two disengaging discs 8 and 9 each have an elongated hole 8'' or 9'' through which the shaft extends, these elongated holes 8'' and 9'' having as longitudinal centre the radius of the shaft directed towards the bearing lugs 8' and 9' respective and their width corresponds to the diameter of the shaft 1. As the bearing pins 14 and 15 of the discs 8 and 9 are shifted with the slides 11 and 13 tangentially to the shaft 1, the discs 8 and 9 act as eccentrics and disengage the pawls 12 and 10 respectively, which extend over the edges of the discs 8 and 9, as shown in Figs. 6 and 7. In order to enable the pawl 12 or 10 to disengage from its ratchet wheel 4 or 5 without difficulty, the pawls 12 and 10 are mounted on their pins 15 and 14 by means of an elongated hole which enables the pawl which is to be disengaged to yield slightly in rearward direction and leave the tooth of its ratchet wheel. Moreover each slide is acted upon by a spring 16, 17 which draws back the non-actuated slide and thus also its pawl so that the disengaging element cannot become operative before the shifting of the actuated slide.

The shifting of the slides 11 and 13 one tooth at a time is effected in the following manner:—

The slide 11 is guided tangentially to the shaft 1 in bearings 18 and 19. An arm 20 of an elbow lever 20—21 oscillatably mounted in a bearing 22 acts on the rear side of the slide 11. The other arm 21 of this elbow lever 20—21 is forked and slotted. A flat magnet core 23 of an electromagnet 24 extends between the fork prongs of this arm 21 and a transverse bolt 25 of the magnet core extends through the slot in these fork prongs. When the electromagnet is excited by actuating a press button the magnet core is raised and the elbow lever 20—21 oscillated so that its arm 20 presses against the slide 11 and shifts same against the action of its spring 16. The distance which the slide is shifted is so calculated that the pawl 10 of the slide rotates the ratchet wheel 5 of the shaft 1 a distance of one tooth. The electromagnet is mounted on brackets 26, 27. The shifting of the slide 13 is effected in a similar manner. An arm 20' of an elbow lever 20'—21' acts on the rear side of the slide. The arm 21' is forked and slotted and between the fork prongs a flat core 23' of an electromagnet 24' extends. A transverse bolt 25' in the magnet core 23' extends through the slots in the fork prongs of the lever arm 21'. The effect of the electromagnet 24' on the slide 13 is similar to that of the electromagnet 24 on the slide 11. Only the press button of one electromagnet of each headlight requires to be actuated. By actuating one electromagnet the headlight shaft 1 is rotated in one direction and by actuating the other electromagnet it is rotated in the opposite direction. The rotation is effected one tooth at a time on ratchet wheels 4 and 5. These have for example each 30 teeth so that in the event of a single operation the shaft 1 is each time rotated 1/30th of a revolution or 12°. In order to prevent the adjusted shaft from sticking on the ratchet wheels 4 and 5 and their pawls and to ensure that the rotation of the shaft during the operation of the electromagnets corresponds each time exactly to the rotation of the ratchet wheel 4 or 5 a distance of a single tooth, a locking device is provided. This device consists of the two toothed wheels 6 and 7 keyed on the shaft 1 and two locking bolts 28 and 29 the bolt 28 being situated opposite the toothed wheel 7 and the bolt 29 opposite the toothed wheel 6. These bolts 28 and 29 are shiftably mounted in a casing 30 a spring 31 pushing the bolt 28 into a tooth gap of the toothed wheel 7 and a spring 32 pulling the bolt 29 into the casing 30. The bolts 28 and 29 carry transverse rods 28', 29' respectively and these rods each project from the two walls of the casing 30 through a short slot, these being so arranged that the bolt 28 can be shifted a short distance into the casing 30 and the bolt 29 a short distance out of the casing 30 to engage a tooth gap of the toothed wheel 6. Elbow levers 33—34 and 33'—34' are each oscillatably mounted on bolts 35 and 35' respectively one on each sidewall of the casing. The upper arms 34 and 34' are situated directly behind the transverse rod 29' of the locking bolt whereas the lower arms 33 and 33' are situated directly in front of the transverse rod 28' of the locking bolt 28. The ends of the upper arms 34 and 34' are each connected by means of links 36 and 36' with the bolts 25 and 25' respectively mounted on the magnet cores 23 and 23' and effecting the oscillation of the elbow levers 20—21 and 20'—21'. When the magnet core 23 or 23' oscillates the elbow lever 20—21 or 20'—21' and thus shifts the slide 11 or 13, the elbow lever 34—33 or 34'—33' is oscillated by the link 36 or 36'. The lower arm 33 or 33' pulls the locking bolt 28 on the transverse rod 28' out of the toothed wheel 7 whereas the upper arm 34 or 34' pushes the locking bolt 29 or the transverse rod 29' into the toothed wheel, the shaft 1 being at the same time rotated the distance of one tooth. The number of teeth of the ratchet wheels 6 and 7 is the same as that of the ratchet wheels 4 and 5. When the actuated electromagnet is rendered currentless by its press button, the coordinate slide 11 or 13 is pushed back into its initial position by its spring 16 or 17 and the elbow lever 20—21 or 20'—21' oscillated into its initial position, the magnet core 23 or 23' being again pulled down on its bolt 25 or 25'. This bolt 25 or 25' also pulls the link 36 or 36' in downward direction and this link oscillates the elbow lever 34—33 or 34'—33' into its initial position so that the spring 32 pulls the locking bolt 29 out of the toothed wheel 6 and the spring 31 pushes the locking bolt 28 into the next tooth gap of the ratchet wheel 7. Each of the two headlights is provided with the device described and can be adjusted independently of the other headlight. By means of a suitable arrangement of the wires to the electromagnets the two headlights may be simultaneously rotated in one direction or the other, or one in one direction and the other in the opposite direction.

We claim:—

1. In an electromagnetic device for rotating the headlights of motor vehicles a casing, a shaft on the headlight rotatably mounted in said casing, two ratchet wheels on said shaft, two slides shiftably mounted in said casing, two pawls one carried by each of said slides and each adapted to cooperate with one of said slides so that when one of said slides is shifted said shaft is rotated in one direction and when the other of said slides is shifted said shaft is rotated in the opposite direction, two pawl-disengaging elements mounted on said shaft one adjacent each of said ratchet wheels and each connected to one of said slides adapted to alternately act on said pawl-slides so that when one of said slides is actuated the element connected to this slide disengages the pawl of the non-actuated slide, two electromagnets each acting in one of said slides, means for actuating said electromagnets, means for actuating said slides through the intermediary of said electromagnets, and means for limiting and locking the feed movements of said shaft.

2. In an electromagnetic device for rotating the headlights of motor vehicles a casing, a shaft on the headlight rotatably mounted in said casing, two ratchet wheels on said shaft, two slides shiftably mounted in said casing, two pawls one carried by each of said slides and each adapted to cooperate with one of said slides so that when one of said slides is shifted said shaft is rotated in one direction and when the other of said slides is shifted said shaft is rotated in the opposite direction, two disengaging discs mounted on said shaft one adjacent each of said ratchet wheels and each connected to one of said slides, each disc having an elongated hole loosely engaging said shaft and a bearing eye, two pawl bolts one on each of said slides each engaging in the bearing eye of one of said discs, the pawl of one slide bearing against the edge of the disengaging disc connected to the other of said slides, each slide on being actuated adapted to effect an eccentric rotation of the disengaging disc connected to the other slide and to disengage the pawl of said other slide, two electromagnets each adapted to act on one of said slides, means for actuating said electromagnets, means for actuating said slides through the intermediary of said electromagnets, and means for limiting and locking the rotary movements of said shaft.

3. In an electromagnetic device for rotating the headlights of motor vehicles, a casing, a shaft on the headlight rotatably mounted in said casing, two ratchet wheels on said shaft, two slides shiftably mounted in said casing, two pawls one carried by each of said slides and each adapted to cooperate with one of said slides so that when one of said slides is shifted said shaft is rotated in one direction and when the other of said slides is shifted said shaft is rotated in the opposite direction two pawl-disengaging elements on said shaft one adjacent each of said ratchet wheels and adapted to alternately act on the pawl of the non-actuated slide through the intermediary of the actuated slide, two electromagnets, a flat magnet core in each electromagnet, two elbow levers one behind each slide each adapted to act with one arm against its slide and connected with its other arm to one of said magnet cores, means for actuating each of said electromagnets, the actuated electromagnet adapted to rock its coordinate elbow lever on its magnet core to shift its coordinate slide to effect the rotation of its ratchet wheel keyed on the shaft, and means for limiting and locking the rotary movements of said shaft.

4. In an electromagnetic device for rotating the headlights of motor vehicles a casing, a shaft on the headlight rotatably mounted in said casing, two ratchet wheels on said shaft, two slides shiftably mounted in said casing, two pawls one carried by each of said slides and each adapted to cooperate with one of said slides so that when one of said slides is shifted said shaft is rotated in one direction and when the other of said slides is shifted said shaft is rotated in the opposite direction, two pawl-disengaging elements on said shaft one adjacent each of said ratchet wheels, adapted to alternately act by means of the actuated slide on the pawl of the non-actuated slide, two electromagnets, a flat core in each electromagnet each adapted to act on one of said slides, two locking wheels on said shaft, two spring loaded bolts one opposite each of said locking wheels, one of said bolts pressed against one of said locking wheels, the other of said bolts held out of engagement with the other of said locking wheels, an oscillatable elbow lever adapted during its rocking movement to act with both arms on both of said bolts to disengage one of said spring bolts from its locking wheel and engage the other of said bolts in its locking wheel, and a forked lever on each electromagnet connected to said elbow lever and adapted to effect the oscillation of said elbow lever when said electromagnets are operated.

GUIDO KLARENAAR.
BERNHARD FRANZ.